Nov. 2, 1954
H. J. KRATZER
2,693,311
COMBINED ENGINE AND AIR COMPRESSOR
Filed May 16, 1952
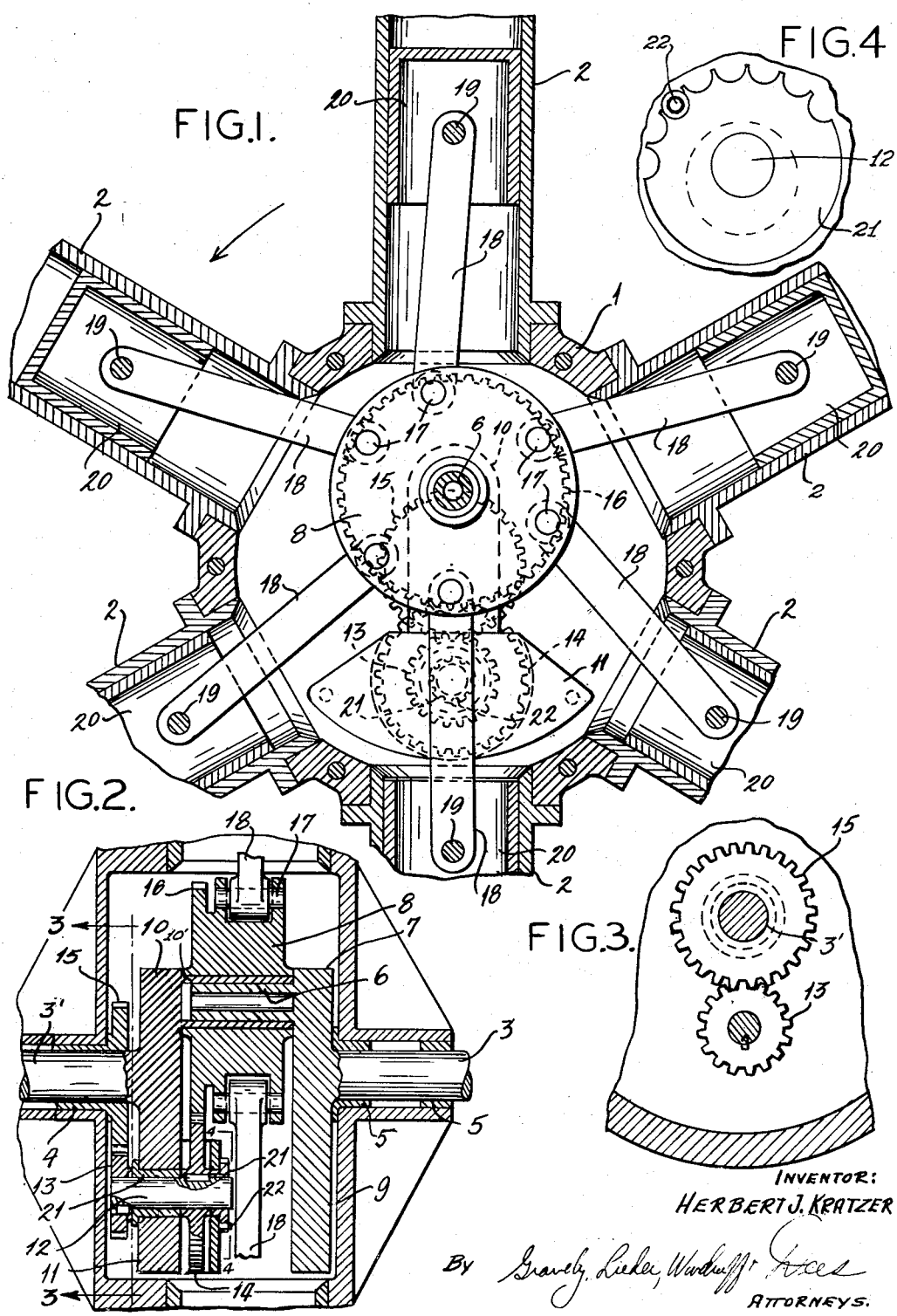
INVENTOR:
HERBERT J. KRATZER
ATTORNEYS.

United States Patent Office 2,693,311
Patented Nov. 2, 1954

2,693,311

COMBINED ENGINE AND AIR COMPRESSOR

Herbert J. Kratzer, St. Louis, Mo.

Application May 16, 1952, Serial No. 288,198

8 Claims. (Cl. 230—56)

This invention relates to air compressors and is more particularly directed to a radial engine in which alternate cylinders are air compressors and the remainder are prime mover or engine cylinders.

The principal object of the invention is to provide an internal combustion engine driven compressor of maximum compactness, low weight, minimum vibration, and maximum efficiency.

Another object of the invention is to provide an engine and compressor unit in which the compressor and engine operate from a common crank shaft and in which a counter-weighted crank pin operates in a bearing that directly transfers the driving torque from alternate firing cylinders to the compressor cylinder spaced between the firing or power cylinders.

A further object of the invention is to provide a particular spacing of the knuckle pins in the crank pin bearing for the several power or firing cylinders and compressor connecting rods in order to impose minimum pressures and stresses in the orienting mechanism.

A still further object of the invention is to eliminate the necessity for a rigid foundation structure for maintaining the alignment of the engine and compressor portions of the machine.

In the drawings:

Fig. 1 is a sectional view of a machine embodying the invention,

Fig. 2 is a sectional view taken along the line 2—2 of Fig. 1,

Fig. 3 is a sectional view taken substantially along the line 3—3 of Fig. 2, and Fig. 4 is a view looking in direction of line 4—4 of Fig. 2.

The invention is embodied in the structure shown in the drawings in which the numeral 1 designates a part of the crank case of a combined engine and compressor. A plurality of cylinders 2, preferably six in number, are disposed about the crank case, and a two-part crank consisting of shafts 3 and 3' is rotatably mounted in the crank case 1 in suitable bearings 4 and 5. The several cylinders 2 are radially disposed with respect to the crank shaft and a crank knuckle pin 6 is secured to an arm 7 integral with the crank shaft 3. A crank pin bearing 8 is rotatably mounted on the crank knuckle pin 6. A counterweight 9 is integral with or otherwise secured to the crank shaft 3 opposite arm 7. The crank knuckle pin 6 is also rotatably supported on bearing pin 10' surrounding pin 6 and secured to an arm 10 having an oppositely extended portion 11 rotatably supporting a shaft 12, the portion 11 constituting a counterweight for the crank shaft. A gear 13 is secured to one end of shaft 12 and a gear 14 secured to the other end of the shaft. Gear 13 meshes with a gear 15 secured to or integral with the crank case or may be secured to the bearing 4. The gear 14 disposed in a suitable aperture in portion 11 meshes with a master gear 16 integral with the crank pin bearing 8.

The crank knuckle pin bearing 8 is provided with a plurality of apertures which receive crank pins 17, the number of pins being equal to the number of cylinders 2. A connecting rod 18 extends between crank pins 17 and a wrist pin 19 secured in piston 20 slidably mounted in cylinder 2. Since alternate cylinders are for the purpose of compressing air, crank pins 17 of the compressor cylinders are spaced differently than would normally be the case if all of the cylinders were for the purpose of producing power or compressing air. Since the power piston 20 in cylinder 2 and the compressor piston 20 in the adjacent cylinder occupy different space relationship, the associated crank pin 17 for the compressor must be circumferentially moved toward the crank pin for a power cylinder. The pin 17 for the compressor piston 20, upper vertical cylinder, is not located on the radial line of the cylinder but is displaced circumferentially therefrom to a point near pin 17 for the power piston displaced counterclockwise therefrom in the direction of rotation, as shown by the arrow in Fig. 1. This displacement of the compressor cylinder pin causes the unit to operate smoothly and without vibration, thereby eliminating the need for a rigid foundation structure. Each of the compressor pins is similarly spaced so that the resulting engine and compressor unit will operate more smoothly. In view of the successive arrangement of the compressor and engine cylinders a more compact unit is produced and the over-all weight materally reduced. The weighted crank shaft in combination with the displaced crank pin contributes to the vibrationless operation of the combined engine and compressor unit.

The shaft 12 is rotatably adjusted in eccentric bushings 21 rotatably mounted in portion 11 for the purpose of taking up the backlash existing between the gear elements on the crank shafts and crankcase. Normal wear of the gears tends to produce this backlash and, unless eliminated, will set up undesirable vibrations in the combination power and compressor unit. A suitable locking pin 22 is provided for locking the eccentric bushing in position after its adjustment. The compressor will operate in a more quiet manner as the result of this adjustment.

What I claim is:

1. A combination engine and compressor comprising a plurality of alternate air compressor and engine cylinders, a piston in each cylinder, a crank shaft, connecting rods disposed between said crank shaft and each piston; and a pin in said crank shaft for each connecting rod, the pins for said compressor connecting rods being placed off center with respect to the center line of the crank shaft, the pins for the engine cylinders being placed in line with the center of the crank shaft.

2. A combination engine and compressor comprising a crank case, a plurality of alternate compressor and engine cylinders disposed about said crank case and extending radially therefrom so that all cylinders are disposed in a single circular plane, a piston slidably mounted in each cylinder, a crank shaft rotatably mounted in the crank case, an annular crank bearing member on said shaft, crank pins in said member; and a connecting rod between each pin and said member, the pins for said compressor cylinders being placed off center with respect to the center line of the crank shaft in the direction of rotation of said crank shaft.

3. A combination engine and compressor comprising a crank case, a two-part crank shaft rotatably supported in said crank case, an arm on one shaft part, a crank pin bearing rotatably supported on said arm, a gear concentric with the other shaft part and secured to said crankcase, a master gear on said crank pin bearing, a second gear meshing with said master gear, means rotatably supporting said second gear and aligned with said arm, a third gear connected to said second gear and meshing with said first mentioned gear, cylinders disposed about said crank case, a piston slidably secured in each cylinder; and a connecting rod disposed between each piston and said crank pin bearing, the point of connection of the adjoining connecting rods being placed off center with respect to the center line of the crank shaft in the direction of rotation of said crank shaft in order to minimize the stresses imposed on the crank pin bearing.

4. A combination engine and compressor comprising a crank case, a plurality of cylinders secured to said crank case and disposed in the plane of a circle, alternate cylinders being power cylinders and the remainder being compressor cylinders a two-part crank shaft rotatably supported in said crank case, an arm secured to one part of said shaft and disposed within the crank case, a crank knuckle pin fixed in said arm, a counterweight opposite said arm, a crank bearing on said knuckle pin, a gear formed on said crank bearing, an arm on the other part of said shaft in which said kunckle pin is received, a portion extending oppositely from said second mentioned arm, an eccentric rotatably adjustable bushing in said extension, a pin in said bushing, a gear secured to said crank case and concentric with the other part of said crank shaft, gears secured to each end of said pin meshing with the gear secured to the crank shaft and with said bearing gear respectively, a piston slidable in each cylinder, a crank pin for each piston in said crank bearing, the pins for each compressor cylinder being circumferentially moved toward the adjoining power piston pin in the direction of rotation of the engine; and a rod for connecting each crank pin with its cooperating piston.

5. A combination engine and compressor comprising a crank case, a two-part crank shaft rotatably supported in said crank case, an arm on one part of said shaft and disposed within the crank case, a gear secured to the crank case concentric with the other part of said crank shaft, an arm on the other part of said crank shaft, a knuckle pin in said arms, a gear and bearing assembly supported by said knuckle pin, an extended portion on the other part of said crank shaft, an eccentric bushing rotatably adjustable in said extended portion, means for locking said eccentric bushing in said extended portion, a pin in said eccentric bushing, a gear on each end of the pin meshing with the gear secured to the crank case and the gear on said crank bearing respectively, a plurality of cylinders secured to said crank case disposed in the plane of a circle, alternate cylinders being a power cylinder and a compressor cylinder, crank pins in said crank bearing, the pins for said compressor cylinder being circumferentially moved toward the power cylinder pins in the direction of rotation of said crank shaft, a piston slidably received in each cylinder; and a connecting rod disposed between each piston and associated pins.

6. A combination engine and compressor comprising a crank case, a series of alternate air compressor and engine cylinders mounted on said crank case disposed in a circle about an axis through said crank case, a crank shaft rotatably mounted in said crank case, a piston slidably received in each cylinder, a series of crank pins carried by said crank shaft, the pins for each air compressor piston being placed off center with respect to the center line of the crank shaft in the direction of rotation of said crank shaft; and a connecting rod secured between each pin and the cooperating piston.

7. A combination engine and air compressor comprising a crank case, a plurality of alternate air compressor and engine cylinders disposed about said crank case and lying in a common circular plane, a piston slidably received in each cylinder, a crank shaft rotatably mounted in said crank case, a crank pin bearing rotatably mounted on said crank shaft, a series of crank pins in said crank pin bearing there being one for each cylinder, the pins for said compressor cylinders being located circumferentially off center with respect to the center line of said crank shaft in the direction of rotation of said crank shaft; and a connecting rod secured to each piston and to the corresponding crank pin in said crank pin bearing.

8. A combination engine and compressor comprising a crank case, a two-part crank shaft rotatably supported in said crank case, an arm on one shaft part, a crank pin bearing rotatably supported on said arm, a gear concentric with the other shaft part and secured to said crank case, a master gear on said crank pin bearing, a second gear meshing with said master gear, means rotatably supporting said second gear and aligned with said arm, a third gear connected to said second gear and meshing with said first mentioned gear, cylinders disposed about said crank case, a piston slidably secured in each cylinder, a connecting rod disposed between each piston and said crank pin bearing, the point of connection of the adjoining connecting rods being placed off center with respect to the center line of the crank shaft in the direction of rotation of said crank shaft in order to compensate for stresses imposed on the crank pin bearing and means mounted in said crank shaft for eliminating the back lash between the gear.

References Cited in the file of this patent

FOREIGN PATENTS

| Number | Country | Date |
| --- | --- | --- |
| 712,652 | France | Oct. 7, 1931 |